Sept. 23, 1941.   J. L. STABLEFORD   2,256,692
PROJECTION SCREEN FOR CINEMATOGRAPHY, TELEVISION, STEREOSCOPY, AND LIKE PURPOSES
Filed Sept. 3, 1940
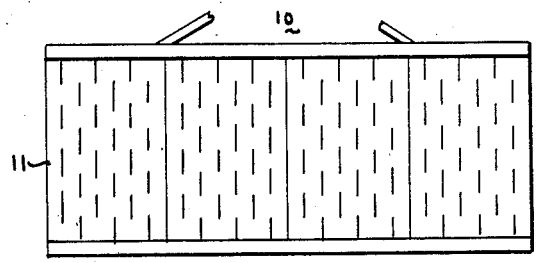
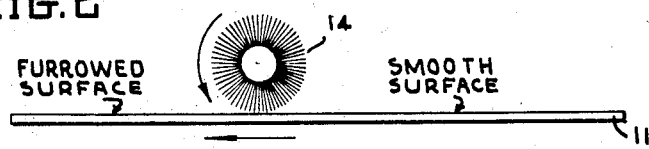
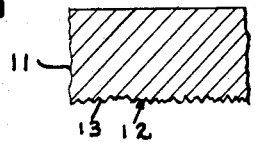
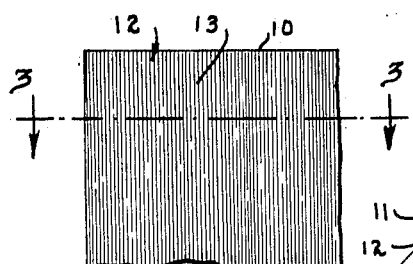
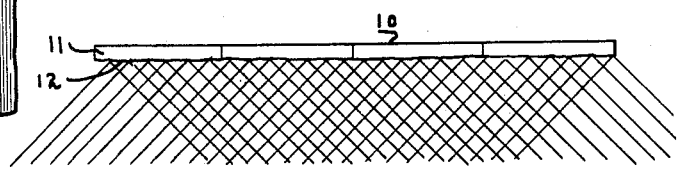
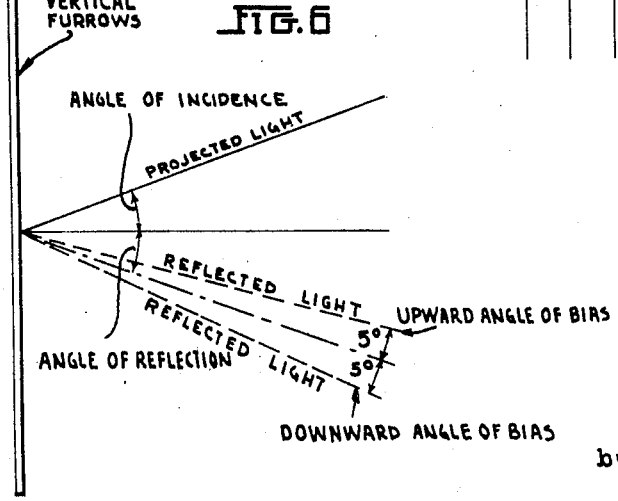
Inventor
JOHN L. STABLEFORD
by
Attorneys Patented Sept. 23, 1941

2,256,692

UNITED STATES PATENT OFFICE 2,256,692

PROJECTION SCREEN FOR CINEMATOGRAPHY, TELEVISION, STEREOSCOPY, AND LIKE PURPOSES

John Leslie Stableford, London, England

Application September 3, 1940, Serial No. 355,234
In Great Britain August 31, 1939

6 Claims. (Cl. 88—24)

This invention concerns improvements in or relating to projection screens for cinematography, television, stereoscopy, and like purposes.

There are two main kinds of screen used for cinematography, namely, reflective screens and diffusing screens.

Reflective screens give, as compared with diffusing screens, a high degree of illumination, but reflective screens have an important disadvantage in spite of the increased illumination given by them, this disadvantage not being present in diffusing screens and residing in the fact that the high degree of illumination covers only an extremely narrow arc (e. g. in the region of 30°) and falls off very rapidly and sharply at the sides, top and bottom, thus rendering a reflective screen only satisfactory in places, for example a cinema, where the audience can be confined in a long narrow space extending in a direction normal to the screen. This is a very important disadvantage to-day when it is the tendency to make cinemas wide and relatively squat or short from the screen to the back of the cinema, for with a reflective screen the audience seated round the sides or wings of the cinema see a very poor picture which is generally badly distorted. The side fall-off or horizontal distortion resulting from the use of a reflective screen is more serious than the vertical or top and bottom fall off or distortion, for the audience is usually normally disposed within a fairly narrow vertical arc, whereas to-day it is usual for the audience to be spread over a very wide horizontal arc.

Diffusing screens diffuse the light in all directions and give a fairly uniform intensity of illumination over an arc of approximately 180°, but the intensity of illumination of a diffusing screen is not nearly so high as that obtained in the region of the centre of a reflective screen which, as explained above, concentrates the reflected rays into a relatively narrow beam, the intensity of which falls off rapidly towards the sides and top and bottom of the screen.

One object of this invention is to provide an improved form of screen for cinematography, television, stereoscopy, and like purposes of a relatively inexpensive character and which will give a relatively high intensity of illumination over a wide horizontal arc with substantially the same intensity of illumination over approximately the same vertical arc as that over which the usual reflective screen gives a satisfactory result.

In the drawing:

Figure 1 is a somewhat schematic drawing of a projection screen.

Figure 2 is a side elevational view of a sheet of metal forming a part of a projection screen and showing the adjacent relationship of a rotating wire brush for providing a furrowed surface upon the sheet.

Figure 3 is a cross-sectional view at right angles to the furrows in the projection screen taken along line 3—3 of Figure 4.

Figure 4 is an elevational view of a portion of a projection screen showing the parallel longitudinally extending furrows therein.

Figure 5 is a top plan view of the projection screen showing the controlled reflection of the light rays from the surface thereof.

Figure 6 is a schematic view showing the angle of bias imparted to a light ray reflected from the projection screen of this invention.

According to this invention I provide a screen 10 formed of a metal sheet 11 of a kind which will reflect satisfactorily for use in the formation of a cinematographic, television, stereoscopic or like screen, e. g. sheet aluminium or aluminium alloy, the light receiving surface 12 of this screen being provided with a large number of fine vertical furrows 13 distributed evenly over that part of its surface to be used for reflecting purposes, such furrows 13 extending vertically from the bottom to the top of the screen and serving to spread the light in a horizontal arc without substantially affecting the reflection of the light over the vertical arc.

Preferably the screen is made of sheet aluminium and this sheet is conveniently of a thickness of .020 part of an inch, although I do not wish to be limited to this dimension, other thicknesses of sheet being capable of giving satisfactory results.

I find that the effect of the vertical furrows 13 formed in the surface of the screen is to scatter the reflected light in a horizontal direction over a wider arc than it would have been reflected over if the furrows had been absent, and in fact by suitably selecting the dimensions, i. e. width and depth of the furrows, I can produce a screen which diffuses the light over a very wide horizontal arc. It is to be noted, however, that the provision of the vertical furrows does not substantially affect the vertical arc over which the light is diffused or reflected by the screen as compared with the results which would be obtained merely by ordinary aluminium or aluminium sheet un-furrowed in the vertical direction.

In manufacturing a screen 10 in accordance with this invention the furrowing of the metal sheet is effected by subjecting the surface of the sheet to the action of a rotary wire brush 14, the latter and the screen being moved rectilinearly relative to one another during the operation so that the screen is furrowed in the direction of its length, i. e. from top to bottom. The brush may be caused, if desired, to traverse the screen several times.

Preferably I use sheet aluminium for producing a screen according to my invention and initially the surface of the sheet which is to form the light receiving part of the screen is of a polished character.

According to one method of forming the screen I use a metal or wire brush of about 8 inches in diameter and revolving at 3,000 revolutions per minute, the wires or bristles of the brush being crimped and of a cross-sectional diameter of .010 inch and made of spring steel and of a length of approximately 2½ inches, there being in the brush approximately 500 bristles to the square inch at the periphery of the brush. The rate of rectilinear relative movement of the screen to the brush is preferably in the region of 30 ft. per minute between the sheet and the brush and the pressure of the brush on the screen is substantially constant.

The sheet 11 being furrowed by the wire brush 14 may be passed over rollers and the wire brush may be arranged to act upon the sheet at a position between these rollers.

By furrowing the sheet as above explained, a further and very important practical result is obtained in addition to that of laterally spreading the horizontal arc over which the light is diffused by the screen, this other advantage being that the furrowing of the sheet in a way which has been explained above causes the screen to have a reflecting bias in the vertical arc as shown in Figure 6, by which I mean that when the screen is stood on edge one way up with the scores or furrows extending vertically and a beam of light is caused to impinge on the furrowed surface of the screen, each light ray is, on reflection, bent towards the normal in the vertical arc, that is the angle of reflection of the light ray instead of being equal to the angle of incidence of that ray is somewhat less, my experiments have shown about 5° less, than the angle of incidence, whilst if the screen is turned in its own plane through 180° to invert it, the incident ray is bent away from the normal so that the angle of reflection in the vertical arc is greater than the angle of incidence by, as I have found from experiments, about 5°, so that in all between the two just mentioned positions of the screen there is a bias or difference of 10° in the angle of reflection through which a light ray would be reflected in the vertical arc.

The angle of incidence is, in the case of cinematograph projection for example, equal to the angle of projection rake which averages 15° to 20° but in extreme cases may be as high as 28°.

It has always been a disadvantage of reflective screens that the vertical angle over which the light intensity is satisfactorily high has been small, and of course much less than that over which the intensity of illumination of a matt-diffusing screen has been satisfactory. By making use of the reflective bias resulting from the furrowing of my present screen and by using the screen in the position in which the reflected rays are bent upwards towards the normal, I am able to employ usefully a greater proportion of the vertical arc over which the intensity of illumination is satisfactory than could hitherto be employed with a reflective screen, the reflected light being thrown higher in the cinema than would be the case if the light were reflected from the screen at an angle to the normal equal to the angle of incidence.

This is of importance for where the vertical arc of reflection is small as it is in a reflective screen as compared with a diffusing screen, the audience in the front stalls of a cinema are liable to get a good picture, while the audience at the top of the balcony, for example, get a very poor picture, and where high rake angles of projection have been employed, this has been an almost insurmountable bar to the use of a reflective screen. It was of course possible to vary the useable arc of reflection by tilting of the reflective screen but even to this there was a limit and it was not possible to offset large angles of rake.

My screen largely overcomes this difficulty and renders my screen suitable in cinemas where the projection rake is too high for the use of an ordinary reflective screen as hitherto known.

A screen constructed in accordance with this invention may be made up of a plurality of side by side sheets or strips which may be suspended in accordance with the complete specification of my British Patent No. 502,153, and the screen may also be slotted in accordance with the complete specification of my United States Patent No. 2,133,120, especially when the screen is to be used for cinematograph projection work. If the screen is slotted then the slotting may be effected before the screen is furrowed and would be cleaned between the steps of slotting and furrowing it.

The screen according to this invention has very important applications in connection with cinematograph projection screens for cinema theatres. In addition and for similar reasons to those for which the screen is beneficial in the cinematograph world, the screen according to this invention is particularly suitable for use as a television screen.

The screen has a further very important practical use, and that is as a screen for stereoscopic projection where use is made of polarised light. For stereoscopic projection where polarised light is employed, use is made by the audience of polarised spectacles, and a highly reflective screen is thus essential because firstly the filters used in projecting and viewing the polarised light cut down between 50 and 75% the light available, and secondly, a diffusing type of screen is useless as it depolarises the light and so causes loss of stereoscopic effect. A screen according to this invention is found to give very satisfactory results in reflecting polarised light and does not appear to de-polarise the light incident thereupon to any appreciable extent.

Another advantage which arises from the use of my screen in stereoscopy follows from the fact that in stereoscopy the picture, as distinct from the case of mono-projection, appears to come from behind the screen and not from its surface, and consequently one appears to look through the screen and there is a danger of the texture of the screen resulting in a veil effect in front of the picture which is very disturbing. With my screen this veil effect is almost eliminated, whereas with a screen having an aluminium paint surface a very heavy veil is clearly apparent unless the aluminium paint is of an extremely smooth character. If the paint is too smooth then the screen becomes practically specular and useless for this reason.

In a screen constructed in accordance with my invention the texture of the furrows is much finer even than the grain in the film as magnified by the screen, and the surface of my screen being metal is not subject to variations in lacquer pigment density, as is the surface of a coated screen and consequently its design enables it to give a stereoscopic picture which is practically free of veil effect.

If desired the screen can be anodized to assist in avoiding the deterioration of the screen as a result of corrosion.

What I claim is:

1. A screen for cinematograph, television, stereoscopic and like projection purposes comprising a highly polished reflecting metal sheet, the light receiving surface of said sheet having a large number of fine parallel furrows arranged in immediate juxtaposition and substantially imperceptible to the naked eye upon close inspection of the surface distributed entirely over the light receiving surface thereof and extending only in vertically arranged alignment from the bottom to the top of the screen, said furrows being of a form to reflect light rays impinged upon the sheet in horizontal and vertical directions only and to cause the screen to have a reflecting bias in a vertical arc.

2. A screen for cinematograph, television, stereoscopic and like projection purposes in combination with a source of light, said screen comprising a highly polished reflecting metal sheet, the light receiving surface of said sheet having a large number of fine parallel furrows arranged in immediate juxtaposition and substantially imperceptible to the naked eye upon close inspection of the surface distributed entirely over the light receiving surface thereof and extending only in vertically arranged alignment from the bottom to the top of the screen, said furrows being of a form to reflect light rays impinged upon the sheet in horizontal and vertical directions only, said screen being positioned with respect to said light source with the furrows in said screen arranged vertically to bias the light rays reflected therefrom upwardly toward the normal.

3. A screen for cinematograph, television, stereoscopic and like projection purposes in combination with a source of light, said screen comprising a highly polished reflecting metal sheet, the light receiving surface of said sheet having a large number of fine parallel furrows arranged in immediate juxtaposition and substantially imperceptible to the naked eye upon close inspection of the surface distributed entirely over the light receiving surface thereof and extending only in vertically arranged alignment from the bottom to the top of the screen, said furrows being of a form to reflect light rays impinged upon the sheet in horizontal and vertical directions only, said screen being positioned with respect to said light source with the furrows in said screen arranged vertically to bias the light rays reflected therefrom downwardly away from the normal.

4. A screen for cinematograph, television, stereoscopic and like projection purposes comprising a highly polished reflecting metal sheet of predominantly aluminum content, the light receiving surface of said sheet having a large number of fine parallel furrows arranged in immediate juxtaposition and substantially imperceptible to the naked eye upon close inspection of the surface distributed entirely over the light receiving surface thereof and extending only in vertically arranged alignment from the bottom to the top of the screen, said furrows being of a form to reflect light rays impinged upon the sheet in horizontal and vertical directions only and to cause the screen to have a reflecting bias in a vertical arc.

5. A light reflecting screen for use for cinematograph, television and stereoscopic projection and like purposes, said screen comprising a plurality of light reflecting metal panels suspended in adjacent relationship, each panel of said screen comprising a highly polished reflecting metal sheet, the light receiving surface of said sheet having a large number of fine parallel furrows arranged in immediate juxtaposition and substantially imperceptible to the naked eye upon close inspection of the surface distributed entirely over the light receiving surface thereof and extending only in vertically arranged alignment from the bottom to the top of the screen. said furrows being of a form to reflect light rays impinged upon the sheet in horizontal and vertical directions only and to cause the screen to have a reflecting bias in a vertical arc.

6. A method for producing a light reflecting screen for use for cinematograph, television, stereoscopic projection and like purposes having a reflecting bias in a vertical arc, comprising taking a highly polished sheet of light reflecting metal and rectilinearly moving the same with respect to a rotating wire brush rotated at high speed with the bristles thereof in engagement with the surface of the metal sheet and having a cross-sectional diameter of .01 of an inch with approximately 500 bristles to the square inch at the periphery of the brush, and moving the brush and the sheet relatively to one another longitudinally and rectilinearly at a speed of approximately 30 feet per minute.

JOHN LESLIE STABLEFORD.